United States Patent
Schmitt et al.

(10) Patent No.: US 12,416,960 B2
(45) Date of Patent: Sep. 16, 2025

(54) POWER CONVERTER AND TRACE SYSTEM FOR A POWER CONVERTER

(71) Applicant: Siemens Aktiengesellschaft, Munich (DE)

(72) Inventors: Regina Schmitt, Erlangen (DE); Heinz Kerpen, Herzogenaurach (DE); Yuriy Ivchenko, Adelsdorf (DE); Jácint Ervin Siklós, Taszár (HU)

(73) Assignee: Siemens Aktiengesellschaft, München / (DE)

( * ) Notice: Subject to any disclaimer, the term of this patent is extended or adjusted under 35 U.S.C. 154(b) by 76 days.

(21) Appl. No.: 18/411,870

(22) Filed: Jan. 12, 2024

(65) Prior Publication Data

US 2024/0241558 A1    Jul. 18, 2024

(30) Foreign Application Priority Data

Jan. 16, 2023    (EP) .................................... 23151753

(51) Int. Cl.
*G06F 1/28*    (2006.01)

(52) U.S. Cl.
CPC ...................... *G06F 1/28* (2013.01)

(58) Field of Classification Search
CPC ........................................................ G06F 1/28
See application file for complete search history.

(56) References Cited

U.S. PATENT DOCUMENTS

| | | | | |
|---|---|---|---|---|
| 6,094,729 A * | 7/2000 | Mann | .................. | G06F 11/3656 714/33 |
| 6,145,123 A * | 11/2000 | Torrey | ................ | G06F 11/3648 714/45 |
| 2022/0004633 A1 * | 1/2022 | Wright | ...................... | G06F 1/28 |

FOREIGN PATENT DOCUMENTS

| | | | | |
|---|---|---|---|---|
| DE | 102020211656 A1 | 3/2022 | | |
| EP | 1302857 A2 * | 4/2003 | .......... | G06F 11/3636 |
| EP | 3687055 A1 | 7/2020 | | |

* cited by examiner

*Primary Examiner* — Zahid Choudhury
(74) *Attorney, Agent, or Firm* — Henry M. Felereisen LLC

(57) ABSTRACT

A power converter includes a trace module designed to record trace signals in accordance with a trace configuration, a storage unit designed to store the trace signals recorded by the trace module, and a web server designed to enable creation of the trace configuration via a web client and to provide the trace signals stored by the storage unit to the web client. The trace configuration specifies, for each type of trace signals to be recorded, a sampling rate for the recording of the trace signals.

15 Claims, 3 Drawing Sheets

POWER CONVERTER AND TRACE SYSTEM FOR A POWER CONVERTER

CROSS-REFERENCES TO RELATED APPLICATIONS

This application claims the priority of European Patent Application, Serial No. 23151753, filed Jan. 16, 2023, pursuant to 35 U.S.C. 119(a)-(d), the disclosure of which is incorporated herein by reference in its entirety as if fully set forth herein.

BACKGROUND OF THE INVENTION

The invention relates to a power converter and a trace system for capturing and evaluating trace signals of a power converter The following discussion of related art is provided to assist the reader in understanding the advantages of the invention, and is not to be construed as an admission that this related art is prior art to this invention.

In order to monitor the function and behavior of a power converter, so-called traces are recorded and evaluated. A trace comprises temporally mutually sequential trace signals. Trace signals are, for example, target and actual values of currents and voltages generated by the power converter, or other variables that are used to control the power converter, such as a rotary speed or a torque of an electric motor that is supplied by the power converter, or values of other operating state variables such as an operating temperature of the power converter or of an apparatus driven by it, for example, an electric motor. Trace signals can also be binary signals, for example ON/OFF commands via the digital inputs of the power converter or internal status signals of the power converter, for example, from its internal sequence control system. The variables for which trace signals are recorded for a trace are herein designated parameters of the trace. Advantageously, therefore a trace can have different parameters so that in the trace, different types of trace signals are recorded. Thereby, for example, the interaction and dependencies of different types of trace signals can be investigated.

To date, the configuration of traces and their evaluation and graphical representation has taken in an engineering system which must specifically be installed and is usually bound to a particular operating system.

It would be desirable and advantageous to provide an improved power converter and improved trace system to obviate prior art shortcomings and to be able to capture and evaluate trace signals in a simple and yet reliable manner.

SUMMARY OF THE INVENTION

According to one aspect of the present invention, a power converter includes a trace module designed to record trace signals in accordance with a trace configuration, a storage unit designed to store the trace signals recorded by the trace module, and a web server designed to enable creation of the trace configuration via a web client and to provide the trace signals stored by the storage unit to the web client, wherein the trace configuration specifies for each type of trace signals to be recorded, a sampling rate for recording the trace signal.

A power converter according to the invention enables, by way of the integrated web server, the configuration of the trace signals to be recorded in a trace module and the graphical representation of the trace signals by way of a web client with which the web server communicates. This enables a person commissioning the power converter and the service personnel to make a detailed analysis of the processes in the power converter in the event of a fault without an engineering system having to be installed. By way of the web server-client architecture, each terminal device can be used with a web browser to represent the trace signals. By this means, the invention enables the analysis of trace signals independently of an operating system or device. For example, the analysis of trace signals by way of the invention is also possible on mobile terminal devices such as tablets or smartphones. The specification of sampling rates for the recording of the trace signals, wherein different sampling rates can be specified for different types of trace signals, further enables a representation of the variations over time of trace signals without having to store the trace signals, for example, with time signatures.

According to another advantageous feature of the invention, the web server can be designed to provide presets for different trace configurations which are selectable via the web client. Advantageously, a selection of parameters of a preset provided by the web server can hereby be changed via the web client. By way of the provision of the presets, the configuration of the trace is simplified for the user. Furthermore, the risk of the generation of faulty configurations of traces is reduced. The changeability of a selection of parameters of a preset provided by the web server via the web client advantageously increases the flexibility of the configuration of traces.

According to another advantageous feature of the invention, the web server can be designed to export the trace configuration. In this way, the trace configuration may also be used for other power converters.

According to another advantageous feature of the invention, the web server can be designed to import the trace configuration and/or a preset. This enables, for example, the creation of a trace configuration in an engineering system and the provision of this trace configuration via the web server.

According to another advantageous feature of the invention, the trace configuration can specify the trace signals to be recorded and a trigger condition for starting the recording of the trace signal and/or a recording duration of the recording of the trace signals. A trigger condition is, for example, the exceeding or undershooting of a threshold value by a trace signal or the occurrence of an alarm or a message. By way of such trigger conditions, the recording of traces can be bound to particular, for example critical or faulty, operating states of the power converter.

According to another advantageous feature of the invention, provision may be made for a short-term memory store in which the trace signals recorded by the trace module are continuously temporarily stored, with the trace signals specified in the trace configuration being stored, before occurrence of the trigger condition, in the short-term memory during a pre-trigger time period which is able to be specified in the trace configuration, with the trace signals being stored with the storage unit in addition to the trace signals to be recorded in accordance with the trace configuration from the occurrence of the trigger condition.

The aforementioned embodiment of the power converter according to the invention also enables trace signals which were recorded in the short-term memory store to be incorporated into a trace shortly before the occurrence of a trigger condition. As a result, for example, indications of possible causes of a critical or faulty operating state of the power converter that is characterized by the trigger condition can be obtained.

According to another advantageous aspect of the invention, a trace system for capturing and evaluating trace signals of a power converter includes a trace module integrated into the power converter and designed to record the trace signals in accordance with a trace configuration, a storage unit integrated into the power converter and designed to store the trace signals recorded by the trace module, a web client designed to provide a graphical user interface for creating the trace configuration and for graphical representation of the trace signals, and a web server integrated into the power converter and designed to enable creation of the trace configuration via the web client and to provide the trace signals stored by the storage unit to the web client; wherein the trace configuration specifies, for each type of trace signals that is to be recorded, a sampling rate for the recording of the trace signals.

The advantages of a trace system according to the invention correspond to the aforementioned advantages of a power converter according to the invention.

According to another advantageous feature of the invention, the web client can be designed to graphically represent a variation over time of the trace signals recorded by the trace module. Advantageously, the web client can be designed to graphically represent variations over time of different types of trace signals recorded by the trace module. In this way, variations over time of different types of trace signals can be advantageously compared and analyzed together.

According to another advantageous feature of the invention, the web client can be designed to represent variations over time of different types of trace signals in different colors. As a result, clarity of the representation of different types of trace signals is advantageously enhanced, in particular when a plurality of different types of trace signals is represented together.

According to another advantageous feature of the invention, the web client can be designed to enable a change to a graphical representation of the variation over time of different types of trace signals independently of one another by way of horizontal and/or vertical displacement and/or by way of scaling. This advantageously enables an improvement in the comparability of different types of trace signals.

According to another advantageous feature of the invention, the web client can be designed to enable a superimposition of horizontal and/or vertical measuring cursors into a graphical representation of the variation over time of the trace signals. This advantageously enables a precise analysis of the trace signals.

According to another advantageous feature of the invention, the recorded trace signals and/or the graphical representation can be exported from the web client. In this way, the trace signals and/or their graphical representation can be made available to other systems for documentation or analysis purposes via the web client.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
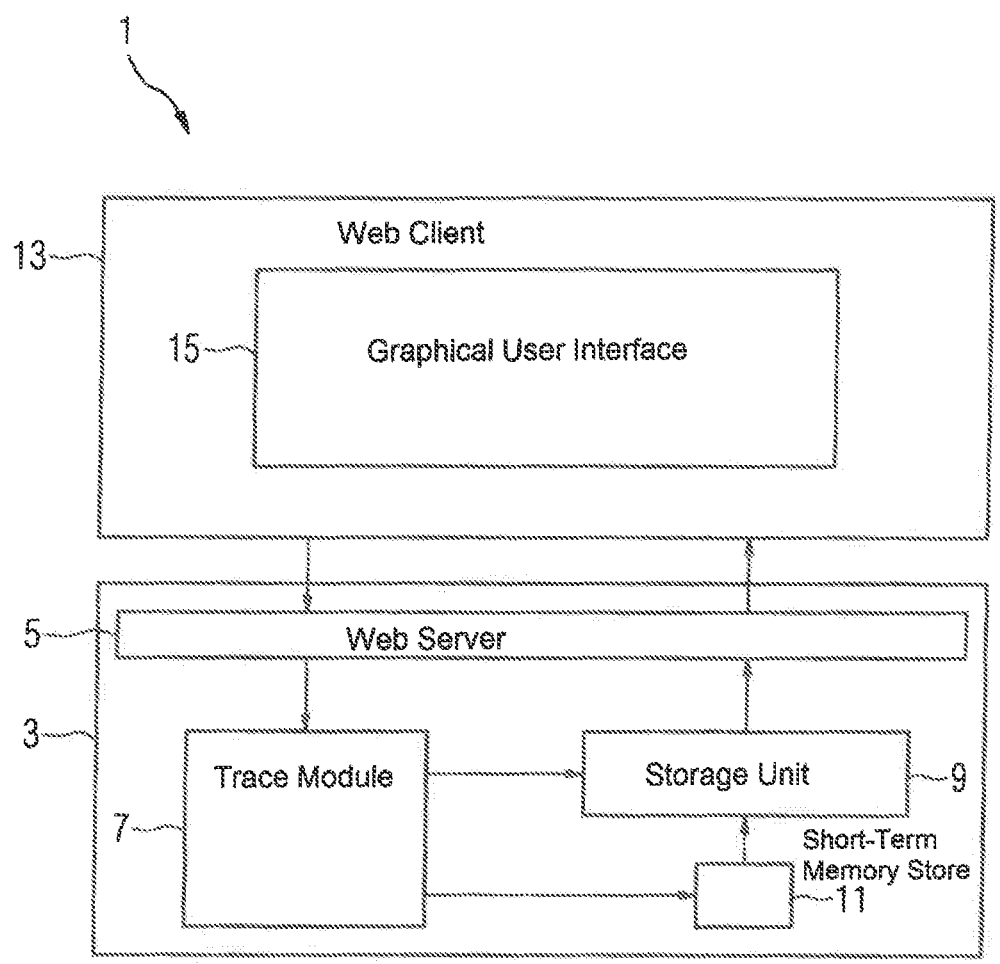
FIG. 1 is a block diagram of an exemplary embodiment of a trace system according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a block diagram of an exemplary embodiment of a trace system according to the invention, generally designated by reference numeral 1, for capturing and evaluating trace signals of a power converter 3. The trace system 1 includes a web server 5, a trace module 7, a storage unit 9, a short-term memory store 11 and a web client 13. The web server 5, the trace module 7, the storage unit 9 and the short-term memory store 11 are integrated into the power converter 3. The power converter 3 with the web server 5, the trace module 7, the storage unit 9 and the short-term memory store 11 form an exemplary embodiment of a power converter according to the invention.

The trace module 7 is designed to record trace signals in accordance with a trace configuration. The trace configuration specifies the trace signals that are to be recorded and, for each type of trace signal to be recorded, a sampling rate for the recording of the trace signals. The trace configuration further possibly specifies a trigger condition for the start of the recording of the trace signals, a recording duration of the recording of the trace signals and a pre-trigger duration.

Trace signals that are to be recorded are, for example, target and actual values of currents and voltages generated by the power converter 3, or other variables that are used to control the power converter 3, such as a rotary speed or a torque of an electric motor supplied by the power converter 3 or values of other operating state variables such as an operating temperature of the power converter 3 or an apparatus driven by it, for example, an electric motor. Trace signals to be recorded can also be binary signals, for example ON/OFF commands via the digital inputs of the power converter 3 or internal status signals of the power converter 3, for example, from its internal sequence control system.

A trigger condition is, for example, the exceeding or undershooting of a threshold value by a trace signal or the occurrence of an alarm or a message. Rather than by way of a trigger condition, the recording of the trace signals can also be started on a manual or time-controlled basis. The pre-trigger duration is elucidated below in relation to the short-term memory store 11.

The storage unit 9 is designed to store trace signals recorded by the trace module 7. The storage unit 9 is designed, for example, as a ring buffer.

The short-term memory store 11 is designed to place trace signals recorded by the trace module 7 continually into short-term memory. When a trigger condition and a pre-trigger duration are specified in the trace configuration, trace signals specified in the trace configuration which have been stored, before the occurrence of the trigger condition, in the short-term memory store 11 during the pre-trigger time period, are stored with the storage unit 9 in addition to the trace signals to be recorded in accordance with the trace configuration from the occurrence of the trigger condition.

The web server 5 is designed to enable the creation of the trace configuration via the web client 13 and to provide the trace signals stored by the storage unit 9 to the web client 13.

Advantageously, the web server 5 is designed to provide presets for different trace configurations which are selectable via the web client 13. For example, a preset specifies the parameters of a trace, and thus the trace signals that are to be recorded, for each parameter the sampling rate at which the associated trace signals are to be recorded, the trigger conditions and the recording duration of the recording of the trace signals. Therein, a selection of parameters of a preset provided by the web server 5 can be amended via the web client 13. For example, parameters can be selected which are provided with an attribute which identifies them as approved for a trace configuration.

The web server 5 can further be designed to export a trace configuration and/or to import a trace configuration and/or a preset.

The web client 13 provides a graphical user interface 15 for creating the trace configuration and for graphical representation of the trace signals. The web client 13 is therein designed to graphically represent variations over time 37 to 40 (see FIG. 3) of the trace signals recorded by the trace module 7.

Furthermore, the web client 13 enables changes to the graphical representation of variations over time 37 to 40 of different types of trace signals by way of horizontal and/or vertical displacements and/or by way of scaling of individual variations over time 37 to 40 and by way of zooming the representation.

Furthermore, the web client 13 enables the superimposition of horizontal and/or vertical measuring cursors into the graphical representation of variations over time 37 to 40 of the trace signals.

In addition, the web client 13 enables recorded trace signals and/or their graphical representation to be exported.

The web client 13 is designed, for example, as a computer program, for example, as a web browser which is capable of execution on different terminal devices, for example, a personal computer, a tablet and a smartphone. The data transfer between the web server 5 and the web client 13 takes place, for example, in accordance with the hypertext transfer protocol (http) or the secure hypertext transfer protocol (https).

Figure 2:
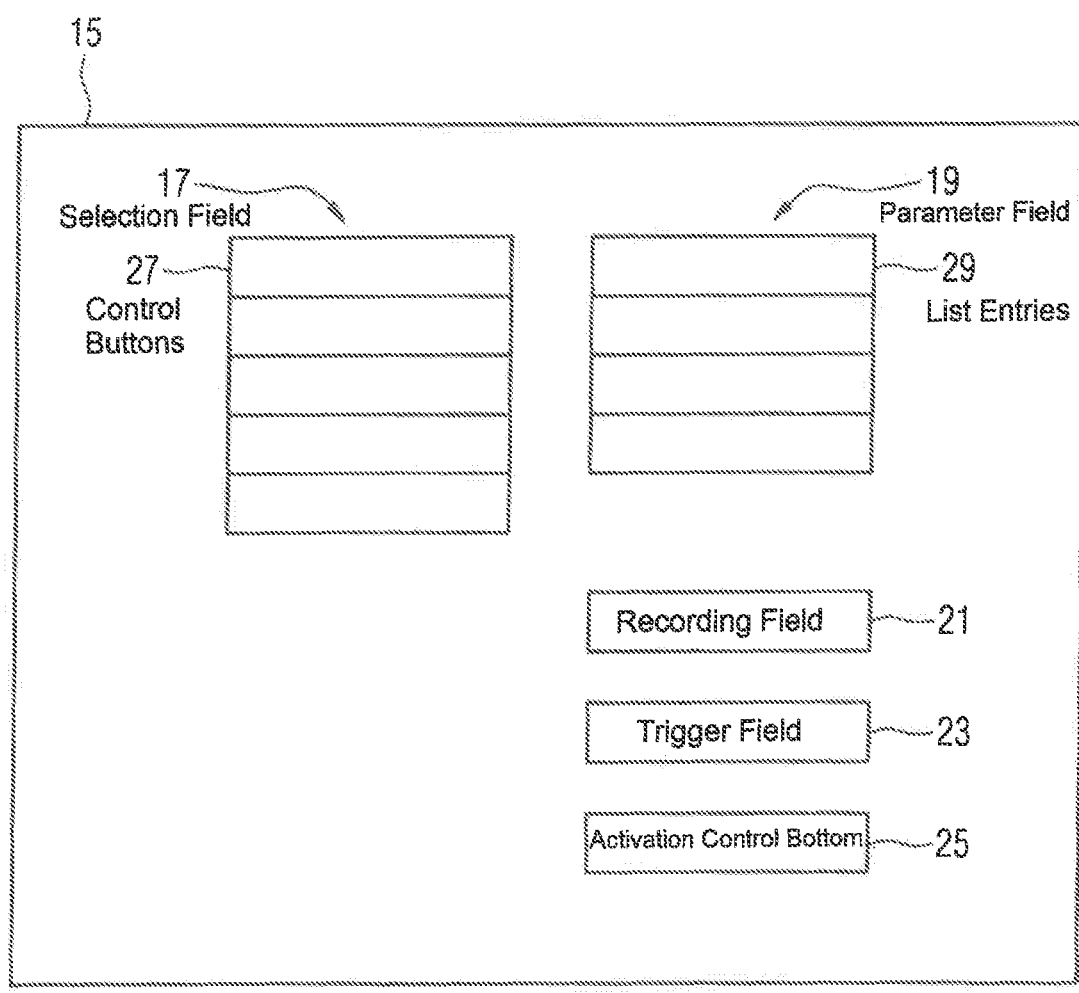
FIG. 2 shows a display of a graphical user interface for the creation of a trace configuration.

FIG. 2 shows, by way of example, a display of the graphical user interface 15 for the creation of a trace configuration. Represented on the graphical user interface 15 are, for example, a selection field 17, a parameter field 19, a recording field 21, a trigger field 23 and an activation control button 25. The selection field 17 has a plurality of selection control buttons 27 via which a trace configuration, that is, a preset, can be selected in each case. Shown in the parameter field 19 for a selected trace configuration are the parameters of the trace configuration in the form of a list with list entries 29. Shown in the recording field 21 is the recording duration for the recording of trace signals of the selected trace configuration. Shown in the trigger field 23 is the trigger condition for the start of the recording of trace signals of the selected trace configuration. With the activation control button 25, the execution of the selected trace configuration can be started.

Figure 3:
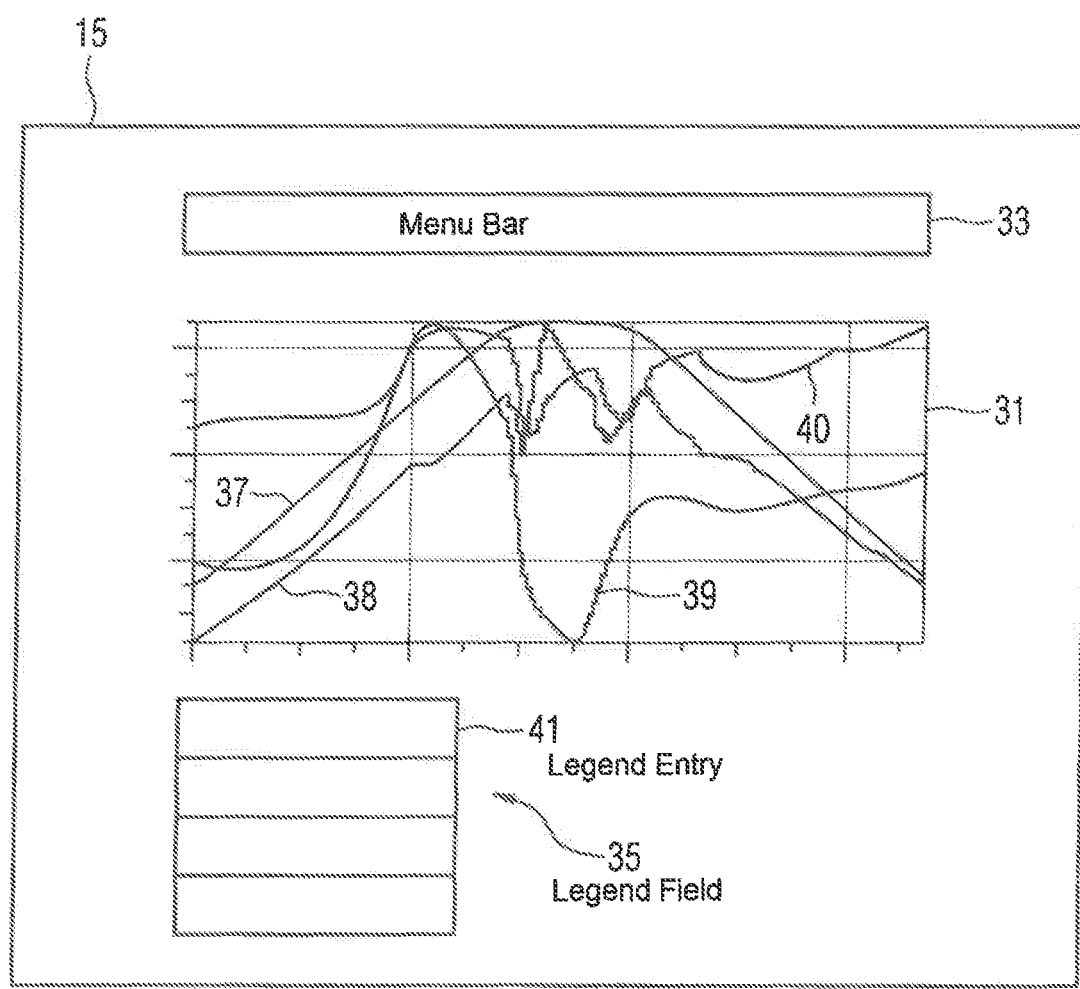
FIG. 3 shows a display of a graphical user interface for the graphical representation of trace signals.

FIG. 3 shows, by way of example, a display of the graphical user interface 15 for the graphical representation of the trace signals of a trace that has been performed in accordance with a trace configuration. Represented on the graphical user interface 15 therein are, for example, a display field 31, a menu bar 33, and a legend field 35. In the display field 31, variations over time 37 to 40 of the trace signals are represented, for example, in a coordinate system the horizontal coordinate axis of which is a time axis. Therein, the variations over time 37 to 40 of different types of trace signals can be represented together, wherein the variations over time 37 to 40 of different types of trace signals are represented in different colors. The menu bar 33 has different control buttons by means of which the representation of the variations over time 37 to 40 of the trace signals is able to be changed. For example, the menu bar 33 has control buttons for zooming the representation or for horizontal or vertical displacement or scaling of individual variations over time 37 to 40 of the trace signals. The legend field 35 has, for each variation over time 37 to 40 of trace signals shown in the display field 31, a legend entry 41 which specifies, for example, the color and the parameter of the respective variation over time 37 to 40. Furthermore, each legend entry 41 can have, for example, a control button or can be designed as a control button, via which, for example, the associated variation over time 37 to 40 can be emphasized in the display field 31 and/or a vertical coordinate axis with the units of the relevant trace signals can be superimposed.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A power converter, comprising:
   a trace module designed to record trace signals in accordance with a trace configuration;
   a storage unit designed to store the trace signals recorded by the trace module; and
   a web server designed to enable creation of the trace configuration via a web client and to provide the trace signals stored by the storage unit to the web client,
   wherein the trace configuration specifies for each type of trace signals to be recorded, a sampling rate for recording the trace signals.

2. The power converter of claim 1, wherein the web server is designed to provide presets for different trace configurations which are selectable via the web client.

3. The power converter of claim 2, wherein a selection of parameters of a one of the presets provided by the web server is changeable via the web client.

4. The power converter of claim 1, wherein the web server is designed to export the trace configuration.

5. The power converter of claim 2, wherein the web server is designed to import the trace configuration and/or preset.

6. The power converter of claim 1, wherein the trace configuration specifies the trace signals to be recorded and a trigger condition for starting the recording of the trace signals.

7. The power converter of claim 6, further comprising a short-term memory store in which the trace signals recorded by the trace module are continuously temporarily stored, with the trace signals specified in the trace configuration being stored, before occurrence of the trigger condition, in the short-term memory store during a pre-trigger time period which is able to be specified in the trace configuration, with the trace signals being stored with the storage unit in addition to the trace signals to be recorded in accordance with the trace configuration from the occurrence of the trigger condition.

8. The power converter of claim 1, wherein the trace configuration specifies a recording duration of the recording of the trace signals.

9. A trace system for capturing and evaluating trace signals of a power converter, the trace system comprising:
- a trace module integrated into the power converter and designed to record trace signals in accordance with a trace configuration;
- a storage unit integrated into the power converter and designed to store the trace signals recorded by the trace module;
- a web client designed to provide a graphical user interface for creating the trace configuration and for graphical representation of the trace signals; and
- a web server integrated into the power converter and designed to enable creation of the trace configuration via the web client and to provide the trace signals stored by the storage unit to the web client,
wherein the trace configuration specifies, for each type of trace signals that is to be recorded, a sampling rate for the recording of the trace signals.

10. The trace system of claim 9, wherein the web client is designed to graphically represent variations over time of the trace signals recorded by the trace module.

11. The trace system of claim 9, wherein the web client is designed to graphically represent together variations over time of different types of trace signals recorded by the trace module.

12. The trace system of claim 9, wherein the web client is designed to represent variations over time of different types of trace signals in different colors.

13. The trace system of claim 10, wherein the web client is designed to enable a change to a graphical representation of the variations over time of different types of trace signals independently of one another by way of horizontal and/or vertical displacement and/or by way of scaling.

14. The trace system of claim 10, wherein the web client is designed to enable a superimposition of horizontal and/or vertical measuring cursors into a graphical representation of the variations over time of the trace signals.

15. The trace system of claim 14, wherein the recorded trace signals and/or the graphical representation are able to be exported from the web client.

* * * * *